(12) United States Patent
Cuypers et al.

(10) Patent No.: US 11,709,023 B2
(45) Date of Patent: Jul. 25, 2023

(54) ENHANCED TCM PRODUCTION AND USE

(71) Applicant: Nederlandse Organisatie voor toegepast-natuurwetenschappelijk onderzoek TNO, 's-Gravenhage (NL)

(72) Inventors: Ruud Cuypers, Delft (NL); Cornelis Petrus Marcus Roelands, Voorschoten (NL); Adriaan Jan de Jong, 's-Gravenhage (NL); Hendrik Pieter Oversloot, Roosendaal (NL); Laurens Daniel van Vliet, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 16/499,119

(22) PCT Filed: Mar. 29, 2018

(86) PCT No.: PCT/NL2018/050194
§ 371 (c)(1),
(2) Date: Sep. 27, 2019

(87) PCT Pub. No.: WO2018/182413
PCT Pub. Date: Oct. 4, 2018

(65) Prior Publication Data
US 2021/0088290 A1    Mar. 25, 2021

(30) Foreign Application Priority Data
Mar. 30, 2017    (EP) .................................. 17163886

(51) Int. Cl.
*F28D 20/00*    (2006.01)
*F28D 20/02*    (2006.01)
*C09K 5/16*    (2006.01)

(52) U.S. Cl.
CPC .................. *F28D 20/003* (2013.01)

(58) Field of Classification Search
CPC ..... F28D 2020/0013; F28D 2020/0021; F28D 20/23; F28D 2020/0017; F28D 20/003; F25B 17/08; C09K 5/16; Y02E 60/14
(Continued)

(56) References Cited

U.S. PATENT DOCUMENTS 4,386,501 A * 6/1983 Jaeger ................... F28D 20/003
62/112
5,298,231 A * 3/1994 Rockenfeller ......... C09K 5/047
423/299
(Continued)

FOREIGN PATENT DOCUMENTS

NL    1021088 C2    1/2004
WO    WO 91/19154 A1    12/1991
(Continued)

OTHER PUBLICATIONS

Finck et al., "Experimental results of a 3 kWh thermochemical heat storage module for space heating application," Energy Procedia 48, pp. 320-326 (2014) Available online at www.sciencedirect.com.
(Continued)

*Primary Examiner* — Frantz F Jules
*Assistant Examiner* — Jason N Thompson
(74) *Attorney, Agent, or Firm* — Leydig, Voit & Mayer, Ltd.

(57) ABSTRACT

The present invention discloses a heat exchanger system for thermochemical storage and release. The system comprises a thermal exchange circuit with a heat exchanger fluid, the circuit further in thermal connection with a thermochemical module. The thermochemical module comprises a thermochemical material that stores and releases heat by a thermochemical exchange process under release or binding of a
(Continued)

sorbate. The thermochemical module comprises a compartment structure that compartments the thermochemical material and further comprises a channel structure. This provides an exchange of the sorbate and the thermochemical material via the channel structure to the compartment structure. A method for the preparation of the compartment structure is also described. In this method, the thermochemical material is brought in a liquid phase and inserted in the compartment structure, while keeping the channel structure free from the liquid phase; and subsequently dried.

19 Claims, 5 Drawing Sheets

(58) Field of Classification Search
USPC .................................................. 165/104.12
See application file for complete search history.

(56) References Cited

U.S. PATENT DOCUMENTS

| | | | |
|---|---|---|---|
| 5,440,899 A | 8/1995 | De Beijer et al. | |
| 6,823,931 B1* | 11/2004 | Stetson | H01M 8/04208 62/476 |
| 2006/0257313 A1* | 11/2006 | Cisar | B01J 8/025 423/648.1 |
| 2007/0113500 A1* | 5/2007 | Zhao | E04D 13/00 428/305.5 |
| 2007/0141322 A1* | 6/2007 | Kamper | C01B 3/001 428/317.9 |
| 2007/0251837 A1* | 11/2007 | Stach | B01J 20/2803 206/0.7 |
| 2012/0251394 A1* | 10/2012 | Komaki | F28D 20/003 422/162 |
| 2013/0056193 A1* | 3/2013 | Thiers | C09K 5/16 165/185 |
| 2014/0116640 A1* | 5/2014 | Shamberger | F28D 20/003 165/4 |
| 2015/0344763 A1* | 12/2015 | Cuypers | C08K 9/10 252/74 |
| 2016/0273840 A1* | 9/2016 | El Hajal | F28F 1/30 |
| 2016/0313034 A1* | 10/2016 | Takeuchi | F28D 7/1676 |
| 2017/0038101 A1* | 2/2017 | Takeuchi | F28D 20/003 |
| 2017/0299278 A1* | 10/2017 | De Jong | F25B 17/083 |

FOREIGN PATENT DOCUMENTS

| | | |
|---|---|---|
| WO | WO 91/19155 A1 | 12/1991 |
| WO | WO 2015/104719 A2 | 7/2015 |
| WO | WO 2016/036242 A1 | 3/2016 |

OTHER PUBLICATIONS

Roelands et al. "Preparation and Characterization of Sodium Sulfide Hydrates for Application in thermochemical Storage Systems," Energy Procedia 70, pp. 257-266 (2015) Available online at www.sciencedirect.com.

Cuypers et al., "Microencapsulation of Salts for Enhanced Thermochemical Storage Materials," TNO Energy and Comfort Systems, Van Mourik Broekmanweg 6, 2628XE Delft, The Netherlands (2014) nicole.papen@tno.nl.

European Patent Office, International Search Report in corresponding International Application No. PCT/NL2018/050194 dated Jun. 7, 2018 (2 pages).

* cited by examiner metal foil reinforced by
thickened
reinforcements metal foil reinforced
by thickened
annular
reinforcements

ENHANCED TCM PRODUCTION AND USE

CROSS-REFERENCE TO RELATED APPLICATIONS

This patent application is a U.S. National Phase of PCT International Application No. PCT/NL2018/050194, filed Mar. 29, 2018, which claims priority to European Application No. 17163886.9, filed Mar. 30, 2017, which are both expressly incorporated by reference in their entireties, including any references contained therein.

FIELD OF INVENTION

The invention relates to the area of seasonal heat storage and systems and materials useful therefore.

DESCRIPTION OF THE PRIOR ART

There is a growing interest for the use of thermal solar collectors to obtain energy that can be used for various needs in houses, and particularly for space heating and provision of hot water. As an estimation, an area of 10-20 $m^2$ of solar collectors would be sufficient for the annual heat demand of about 20 GJ of a well insulated dwelling, provided that the surplus from summer could be used for the deficit in the winter. This requires storage of about 10 GJ. If this is stored in a hot water tank, this would require about 50 $m^3$ (for a tank at 90° C. to be used at 40° C.), which would be too big for domestic applications. An attractive alternative is to store heat by drying thermochemical materials (TCM) with an excess of solar heat from e.g. solar collectors in the summer. In the winter, it is then possible to hydrate the TCM and in this way to release the heat.

In general, thermochemical heat storage (TCS) is based on thermally reversible reactions such as:

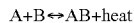

The reaction may contain more compounds and is not restricted to two compounds A and B. For the above reaction, the charging process to store the energy is an endothermic reaction wherein heat is supplied to split compound AB into compounds A and B. The energy is released in the form of heat when A and B are brought together (discharging process). A can be referred to as a sorption material (or sorbent), B is a working fluid (or sorbate), AB is working fluid adsorbed (or absorbed) on the sorption material. A and B can also both be fluids.

These reactions are also called sorption and desorption reactions. In case of water being one of the compounds A or B, these are hydration or dehydration reactions, for example:

This sorption or hydration reaction provides for a high energy density of about 2.7 GJ per $m^3$ of $Na_2S \cdot 5H_2O$, whereby the heat for evaporation is supplied from an external source. TCM do not only have a higher heat storage density compared to hot water storage, but also do not require thermal insulation during periods of storage. One only needs to keep chemical components separate, in the above case dried sodium sulfide and water, which is ideal for seasonal storage.

Examples of TCM storage systems are known, e.g. from EP1525286. However, there are some problems in the use of TCM for thermochemical heat storage. With thermochemical materials in the form of hygroscopic salts, potential storage densities of 1-3 $GJ/m^3$ are possible, significantly higher than hot water storage, but for these materials undesirable processes could play a role especially at higher temperatures, such as melting, coagulation, volume changes during hydration or dehydration, scaling, corrosion, decomposition, and other undesirable chemical side reactions.

From U.S. Pat. No. 5,440,899 it is known to enhance hygroscopic salts with fibrous materials for optimizing the recrystallization process and for heat transport purposes. However, there remains a desire to provide for high storage density at a given desorption temperature, preferably a factor higher than that of zeolite and with low desorption temperatures, so that the negative effects mentioned herein-above are reduced or disappear. Furthermore, it is desired to provide a more effective exchange of heat and evaporation process in the hydration reactions indicated above.

SUMMARY OF THE INVENTION

In order to address at least some of the above desires, the present invention provides, in one aspect, a heat exchanger system for thermochemical storage and release. The system comprises a thermal exchange circuit with a heat exchanger fluid, the circuit being in thermal connection with a thermochemical module. The thermochemical module comprises a thermochemical material that stores and releases heat by a thermochemical exchange process under release or binding of a sorbate acting as thermochemical agent. The thermochemical module is provided with a granular material that compartments the thermochemical material in granular form ("pellets"). The wall of the granular material is transgressive to the sorbate but retains the thermochemical material, which granular material is arranged to provide, in use, an interspace between the pellets of granular material, that provides an exchange of the sorbate from the reactor vessel via the interspace to the thermochemical material.

The main advantage of such structures is that they are able to provide efficient sorbate transport through a highly packed bed, and improved ease of filling of the reactor. By heat conducting pellets vapor channels can be formed, in contrast to homogeneous addition of heat conducting material or globally homogeneous porous structures. This allows optimization of transport properties.

A heat-exchanger fluid has capacity to store and transport heat, of which many examples such as water are known. By heating the thermochemical material by heat conducted via the heat exchange circuit, the thermochemical material is separated into chemical constituents, so that thermochemical agent is extracted from the material e.g. in the form of a vapour. In an embodiment, the agent is a sorbate, e.g. water, and the vapour is water vapour.

The channel structure formed by aligning the pellets, with its directional structure, efficiently enhances vapor transport towards the vapor volume in the reactor vessel. Similarly, by a heat transport structure heat flow is enhanced. Vapor and heat channels perpendicular to the required direction are not necessary, and are omitted, thereby increasing heat storage efficiency.

In another aspect, the present invention also provides a method for the preparation of the pellets.

BRIEF DESCRIPTION OF THE DRAWINGS

The invention will be further elucidated in the figures.

DETAILED DESCRIPTION

A thermochemical (TCM) module is a module containing thermochemical material. A thermochemical module is typically provided with a heat source (heat exchanger), in order to control the temperature of the module. Thermochemical materials are able to undergo reversible reactions wherein sorption of a certain compound is associated with heat release. Typical thermochemical materials are known to a skilled person and are for example salts, hydrates releasing heat when reacting with water to form (higher) hydrates, as exemplified above. An overview of some thermochemical materials is presented in P. Tatsidjodoung, N. Le Pierrés and L. Luo, «A review of potential materials for thermal energy storage in building applications», Renew. Sustain. Energy Rev., vol. 18, n. 0, p. 327-349, February 2013. Generally, thermochemical materials can be divided into a group of sorption phenomena materials, e.g. zeolites, in which the sorbate is physically adsorbed and/or absorbed by the material, and chemical reaction materials, e.g. oxides/hydroxides and hydrate-forming salts, wherein the sorbate is chemically bonded to the material. In the latter case the sorption leads to the formation of another chemical compound (hydroxide from a respective oxide) or the sorbate is included into the crystal structure of the material, e.g. forming a hydrate. Particularly preferred in the present invention are the thermochemical materials that react with water (vapour, liquid) as the sorbate to release heat.

Figure 1A:
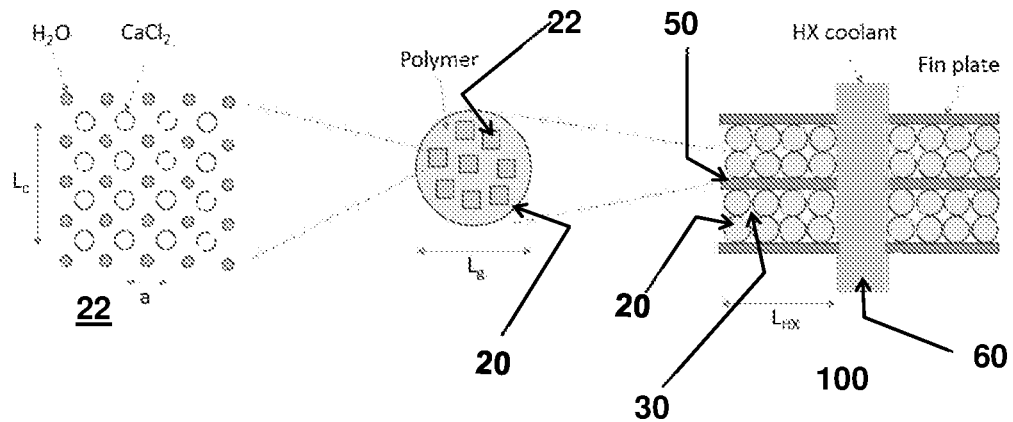
FIGS. 1A and 1B show an exemplary embodiment.

In the embodiment of FIG. 1A, thermochemical module 100 is provided with a granular material 20 that contains the thermochemical material 22 in granular material form. In this way granular material 20 comprises a wall structure 21 that is transgressive to the sorbate but retains the thermochemical material 22. The wall structure is e.g. formed by an open polymer network. Alternatively, a coating material can be applied e.g. by spray coating, dip-coating or drum-coating In use, an interspace 30 is formed between the granular materials 20, that provides an exchange of the sorbate via the interspace 30 to the thermochemical material 22. By a longitudinal design of the pellets, a dominant direction of the interspace 30 can be provided that is oriented anisotropically e.g. directed towards a reactor exhaust. The granular material structure 20, in the example, is formed by a stabilizing material, e.g. organic or inorganic polymer, ceramic, clay-like material, carbon-based material, in the shape of spheres, cylinders, rods or a suitable structure forming an interspace of sufficient ratio. E.g. in the form of pellets, brickets, pellets, rods, etc. of a certain shape and size, and with a certain aspect ratio that allows channel forming. In the interspace, or channels, water vapour can interact with the thermochemical material 22 that is contained by the stabilizing material 21. E.g. compartments can be formed as polymer granular materials, e.g. of a size with a radius of e.g. more than 5 mm, to allow channels with a typical diameter of ~70% of the granular material diameter.

Figure 1B:
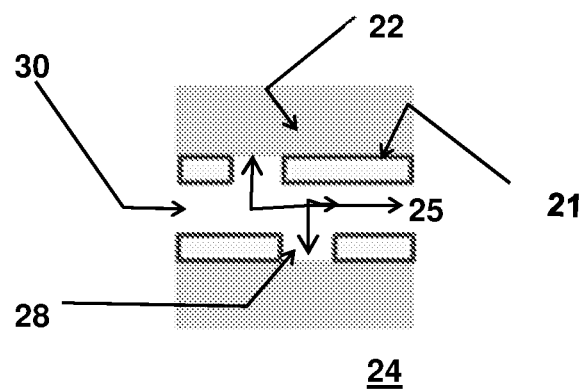

Embodiment illustrated in FIG. 1B, further illustrates compartment structure 24 that contains the thermochemical material 22 in the granular material 20. Between the granular materials 20 a channel structure 30 is formed to provide an exchange of the thermochemical agent 25 (sorbate) and the thermochemical material. The granular material may be formed of e.g. a polymeric material selected from polyacrylate, polymethacrylate, polyvinylpyrrolidone, polyurethanes, polyepoxides poly(ethyl)methacrylate, poly(isoprene), polysiloxane (vulcanised), cellulose, cellulose derivative, poly(oxy-2,6-dimethyl-1,4-phenylene), polystyrene, polyacrylonitrile, or a copolymer of these, or a mixture of these. This material can be produced in the form e.g. of a cylinders or spheres, wherein the walls are formed e.g. from a cellulose, methylcellulose, ethylcellulose, cellulose acetate, or cellulose nitrate. To manufacture a thermochemical module, e.g. the granular material 20 is filled with thermochemical material 22. In an embodiment, the wall structure 21 of the granular material 20 forms an interface that is transgressive to the thermochemical agent (sorbent). For example, the granular material may be provided with microperforations 28, to optimize interaction of the thermochemical agent and the thermochemical material. A typical perforation size 28 may be in the micron range, preferably too small to leak the thermochemical material into the channel structure when heated to reach a liquid phase that may occur due to overhydration. Indeed advantageously the pore size is small enough so that surface tension prevents leakage of liquid through the pores.

Figure 2A:
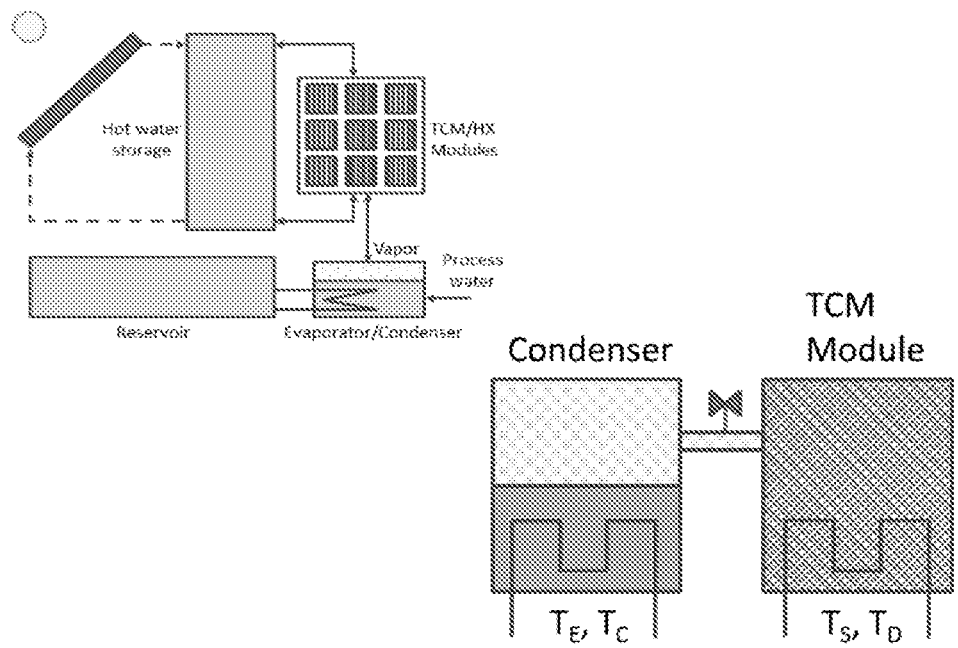
FIGS. 2A and 2B show example setups of a TCM module and a phase diagram respectively
Figure 2B:
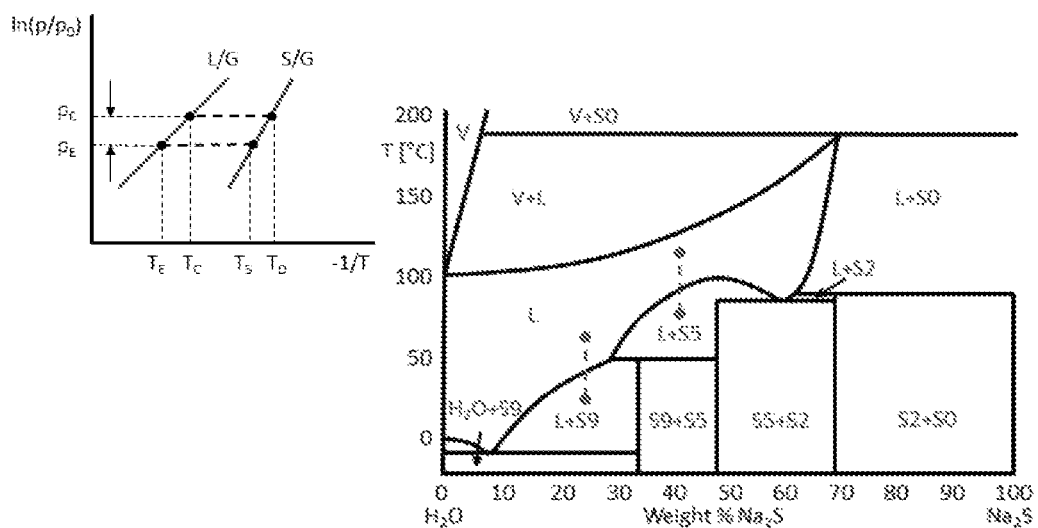

In more detail in FIG. 2A a typical application is illustrated for heat storage, preferably for seasonal heat storage. In conformity with FIG. 2B, the following annotations are used: $T_E$ evaporation temperature, pr evaporation vapor pressure, $T_S$ sorption temperature, $T_C$ condensation temperature, $p_C$ condensation vapour pressure, $T_D$ desorption temperature. FIG. 2B additionally shows a phase diagram for watery $Na_2S$ salt, wherein it is shown that the solid liquid phase transition can be attained for temperatures under 100° C., e.g. 90° C. that can be realistically produced. In an embodiment, the liquid phase is prepared at a temperature above 80 degrees Celsius and a weight percentage of $Na_2S$ is larger than 30%. This has an advantage that the watery content of the module can be kept low, while the module is filled with thermochemical substance.

In FIG. 2A a system is shown comprising a TCM module, connected through a valve for water vapor with a water condenser. The water vapor acts as an agent for heat release. In the case of water, a condenser is useful but not necessary to condense the vapor, for other agents closed circuits are preferred. The water is stored in the water condenser and vaporized at an evaporation temperature $T_E$ using a heat source. The vapor is then absorbed by the dehydrated sorbent in the TCM module at a sorption temperature $T_S$ releasing its enthalpy of absorption. The thereby generated heat can be used, e.g. for space heating or domestic hot water production.

To charge the thermochemical storage in the TCM module, the thermochemical module can be heated (e.g. heat from solar collectors) at a desorption temperature $T_D$ to release a certain amount of water vapour. The desorbed vapor may be condensed in the water condenser at a condensation temperature $T_C$ and the associated waste heat is released. The condensed water and dehydrated sorbent may be stored in separate tanks at ambient temperature. As long as these agents are not put in contact again, no heat losses occur.

In some embodiments, the thermochemical material used in the method of the present invention is selected from the group consisting of zeolites, silica gel, hygroscopic salts, metal-organic frameworks (MOF), carbon, and aluminum phosphates. In some preferred embodiments, the thermochemical material is a sorption phenomenon material, such as zeolites, silica gel, MOF, carbon and aluminum phosphates. An advantage of such materials is that they typically do not swell/shrink during (de)sorption and therefore exhibit a rather good stability during recycling. A disadvantage is however that sorption phenomenon materials usually have a rather low heat storage density. In other preferred embodiments, the thermochemical material used in the method is a chemical reaction material, e.g. hygroscopic salts. Salts possess a rather high heat storage density for any typical reversible reaction but the sorption/desorption processes are likely to disrupt the crystal structure, which leads to a lower recycling stability. The hygroscopic salts are usually capable of forming hydrates. Preferably, the hygroscopic salt is selected from the list consisting of chlorides, sulfates, iodides, nitrates, sulfides and its hydrates. Examples are sodium sulfide, magnesium chloride and their hydrates.

In some embodiments, multiple thermochemical modules may comprise different thermochemical materials. For example, one thermochemical module may comprise a sorption phenomenon material, and the other one a chemical reaction material. In one of the embodiments, the thermochemical module used as a condenser contains silica gel, while the other thermochemical module contains a hygroscopic salt. In another embodiment, both TCM modules contain a hygroscopic salt.

Also the weight of the thermochemical material can be varied. In some embodiments, the thermochemical modules contain the same amount of the thermochemical material, while in other embodiments it can be advantageous to use more material in one of the TCM modules, e.g. in the one which works as a condenser. This means that the TCM modules may have the same or different volumes. In some embodiments, it is preferred to use identical TCM modules having the same volume and the same thermochemical material.

A TCM module typically comprises a heat exchanger that allows to bring the module at a required temperature, e.g. $T_D$ for dehydration. The heat released in the TCM module can be collected through a heat exchanger present in that module.

Since the processes of sorption and desorption are interrelated, the present invention can equally be used as a method for sorption in a system for thermochemical storage according to the invention, wherein the sorption in the first thermochemical module is realized using the second thermochemical module as an evaporator, instead of a water evaporator. The advantage of this is that higher sorption temperatures in the second thermochemical module can be realized.

The system and the method described above are particularly useful for heat storage, preferably for seasonal heat storage but may be used for any other useful purpose. For the purpose of clarity and a concise description features are described herein as part of the same or separate embodiments, however, it will be appreciated that the scope of the invention may include embodiments having combinations of all or some of the features described.

Parts and percentages mentioned in the examples and through the description, are by weight, unless otherwise indicated. The sorption and desorption processes are illustrated using vapour pressure diagrams, which are described by the Clausius-Clapeyron equation:

$$dp/dT = \Delta h / T \Delta v,$$

wherein p is the sorbate (water) pressure, T temperature, $\Delta h$ molar enthalpy and $\Delta v$ molar volume differences between the phases of the sorbate.

In the known TCM modules, to arrive at sufficient power, salt grains are embedded in a fin plated heat exchanger structure. For example, when using zeolite grains, an open structure with vapor transport is provided by spherical grain structures. Copper fin plates provided at short distances from grains transport heat out of the TCM module. To this end a thermal circuit with a thermocapacitive fluid, e.g. coolant is arranged to carry away heat produced by hydration or can deliver excess heat for dehydration.

The grain structure, with possibly additional porosity in the grains, can be regarded as a composite material with enhanced vapor transport. Similarly, heat conducting materials such as graphite can be added to arrive at a composite material with enhanced heat transport. One way to realize this is to absorb liquid salt in Naturally Expanded Graphite (NEG).

Figure 3A:
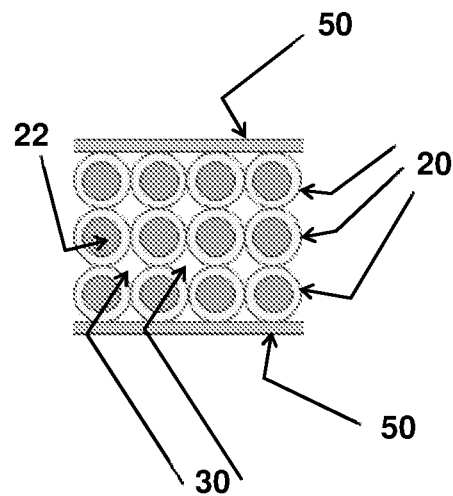
FIGS. 3A and 3B show further exemplary implementations.

In FIG. 3A an example is shown of a packed arrangement of pellets 20 in a fin structure 50 comprised in the TCM module. The pellets 20 are filled with a thermochemical material 22. The porous pellet allows for an anisotropic vapor transport along a longitudinal axis of a pellet, that is coaligned relative to the other pellets. These pellets can be polymer tubes with porous walls, filled with salt/TCM. Wall porosity can be 50%. The pellets are kept parallel to fin plates 50 and are directed towards a reactor exhaust (not shown). Vapor transport of this composite TCM is then only in the required direction, i.e. in an optimal direction to an exhaust, providing a better drainage and flow of the vapor, while no space is lost for unnecessary or ineffective transport in perpendicular directions, i.e. away from the optimal direction towards the exhaust. Additional to confining the material 22, the pellets provide stability for the vapor channels 30 during successive cycles of hydration and dehydration. If the pores are sufficiently small and the polymer hydrophobic, the TCM might even be liquid and yet stay inside the tubes due to surface tension. This would protect the structure to unintentional occurrence of liquid states, such as $Na_2S \cdot 5H_2O$ above 83 degrees C. But it would also allow intentionally working with liquid TCM, such as $CaCl_2 \cdot 6H_2O$ above 35 degrees C. and higher hydration states. An additional advantage of the structure is that vapor sorption along TCM can be controlled, i.e. vapor can be sorbed more evenly along the TCM pellet dependent on a varying pellet wall porosity. One may even increase porosity along the pellets further away from the reactor exhaust to obtain perfectly homogeneous TCM sorption in the reactor. The structure of FIG. 3A can be provided as follows. In a well-conditioned room (stable T and p(H2O)) a powder is brought into a pill-press, also known as a low pressure extruder or pelleting machine. By adjusting the press to the right speed and using nozzles with a suitable diameter and length in the counter rotating toothed rollers, pills with the right diameter and length are collected. According to the property desired, through-hardened pellets or pellets just hardened on the outside can be produced in several kgs/h. sieving after production yields stable dust-free cylindrical pellets. One way of introducing the pellets in the TCM module by filling the module with the cylindrical pellets, and subsequently vibrating the module, i.e. shaking it at a relatively high frequency, preferably along a single longitudinal direction, relative to the desired orientation of the pellets (for example, in axial or lateral direction of the desired alignment direction of the pellet). This results in a close packing of the pellets in the free volume of the thermochemical module, wherein the pellets are substantially aligned along a dominant longitudinal direction. It is further possible to provide the fin structure 50 with a microgroove pattern (not shown), which enhances alignment of the pellets relative to the fin structure, and TCM module in general.

Figure 3B:
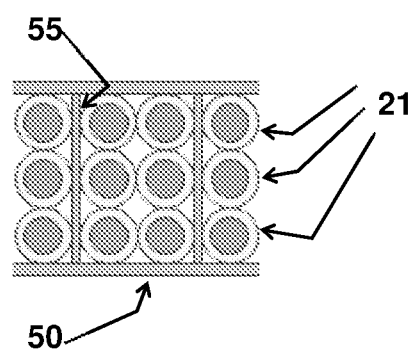

In another example, shown in FIG. 3B, enhanced heat transport is provided by manufacturing the porous cylinder walls 21 of a good heat conducting material such as graphite. This provides good heat conductivity in the same direction as vapor transport, i.e. parallel to the cylinders 20 in axial direction. When the pellets walls are in good mechanical contact, heat transport will also be enhanced in perpendicular direction, which may be towards fin plates 50, but this does not provide a shortest path for heat from TCM to the fin plate. In cross direction to pellets, one may add a heat conducting structure 55 that connects to fin structures 50.

Figure 4A:
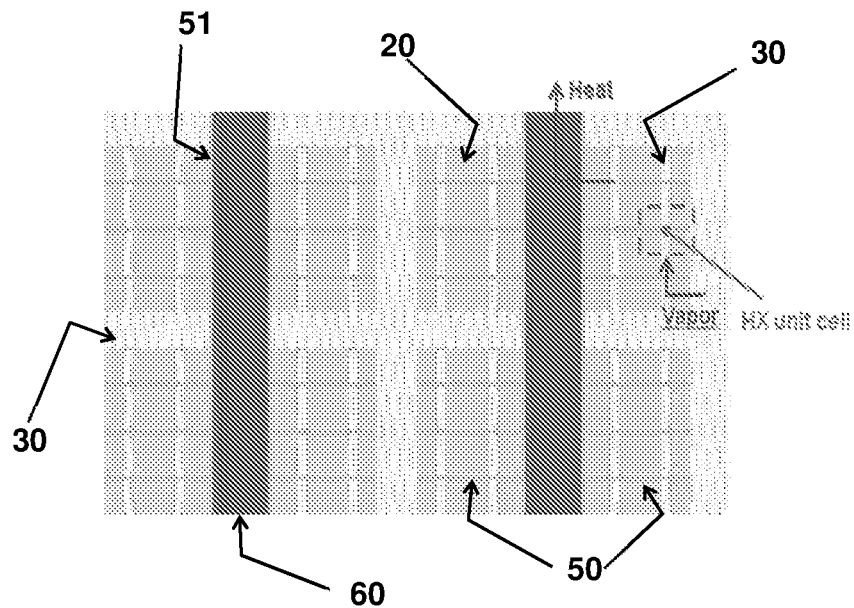
FIGS. 4A and 4B show a further embodiment with vapour channels.

In FIG. 4A a further embodiment is shown, wherein a planar structure of a thermoconductive material is formed between strips 50. The compartment structure 30 extends in a direction away from circuit walls 51 that form the thermal exchange circuit 60 and that thermomechanically connects the circuit walls 51 to the compartment structure. The vapor channels are formed as strips 50 are traversing the channel structure 20.

In the embodiment, compartments 30 may be formed by thermochemical material 22, and that are in communication with the channel structure, that preferably has a dominant direction. Thus, by vapourization of the thermochemical agent, the channel structure 20 can filled with a vapour of the thermochemical agent, and conversely, by heating the thermochemical material by heat conducted via the thermal exchange circuit, the thermochemical material is separated into chemical constituents, so that thermochemical agent is extracted from the material e.g. in the form of a vapour. In an embodiment, the agent is water, and the vapour is water vapour.

Figure 4B:
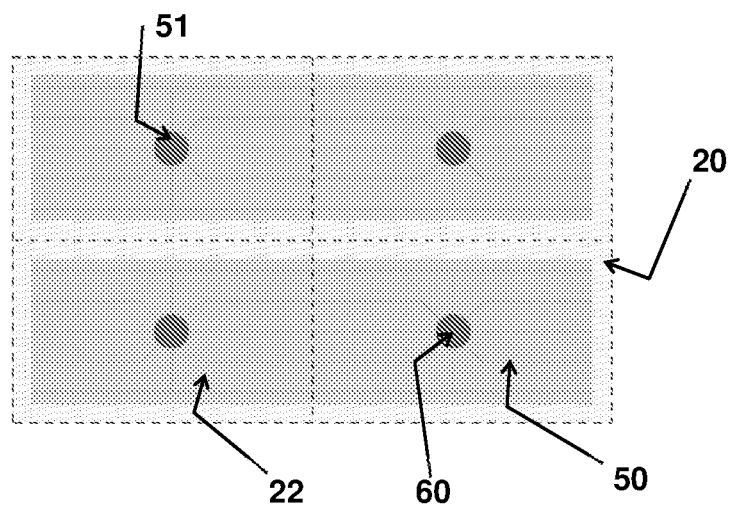

FIG. 4B shows a schematic plan view of the structure of FIG. 4a. To optimize heat conduction to and from the thermal exchange circuit, the planar structure 50 is formed of a thermoconductive material, e.g. copper, that extends into the compartment structure in a direction away from circuit walls 51 that form the thermal exchange circuit G0 and that thermomechanically connects the circuit walls 51 to the thermochemical material 22. The strips may be formed, e.g. in the form of a tree structure rooting in the exchange circuit and expanding into the thermochemical compartments 30, typically in a planar way.

Figure 5A:
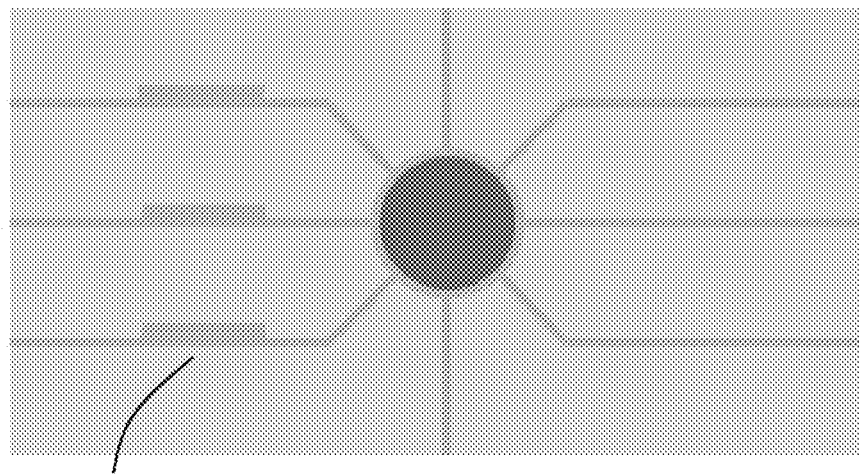
FIG. 5A is a plan view variation of FIG. 4B that depicts the planar structures having thickened reinforcements.

FIG. 5A is a plan view variation of FIG. 4B that depicts the planar structures having thickened reinforcements.

Figure 5B:
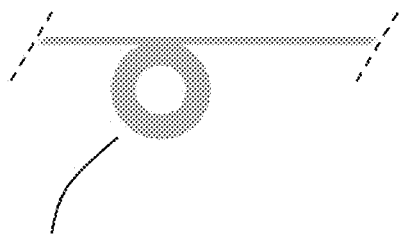
FIG. 5B is a variation of the physical components depicted in FIG. 5A wherein the thickened reinforcements are annular in form.

FIG. 5B is a variation of the physical components depicted in FIG. 5A wherein the thickened reinforcements are annular in form.

FURTHER EMBODIMENTS

In an embodiment, the planar structure is formed as, or by strips 50 of metal foil extending from the circuit walls of thermal exchange circuit.

In an embodiment, the thermochemical module may be manufactured with the planar structure formed by strips 50 of metal foil extending from the circuit walls 51. For example, metal foil may be reinforced by thickened reinforcements that allow passage of the thermochemical exchange circuit; the compartment structure and the channel structure. In the manufacturing process, cylinders may be inserted passing through a foil structure. The cylinders 20 may be formed as vapour channels, or may be filled with thermochemical material, wherein the vapour channels are formed by the spaces in between the cylinders. To optimize the manufacturability and improve the thermal conductivity, metal foil may be reinforced by thickened reinforcements that allow passage of the thermochemical exchange circuit; the compartment structure and the channel structure.

In another embodiment, the structure may be formed by additive manufacturing, e.g. in a multicomponent additive manufacturing process. Also, parts of the thermochemical compartments may be manufactured by additive manufacturing.

In an example, a thermochemical storage can be formed with a zeolite used as thermochemical material. In this example, Zeolite 13X is used as TCM and water as a sorbate. In another example, different TCM materials may be used such as: Zeolite Z13X and Silicagel Grace 125 (SG125). For instance, two TCM modules may be used with different materials. One module uses Zeolite Z13X and the other one SG125 of equal mass. The module with SG125 is used here as a condenser for the zeolite module. The modules and the water condenser are connected through a central tube as explained herein-above. In yet another example, different TCM materials may be used such as $Na_2S$ and SG125.

In this example, a TCM module with hygroscopic salt $Na_2S$ may be dried using a silica gel containing module. The modules and the water condenser are connected through a central tube as explained herein-above.

This system allows to carry out desorption of $Na_2S$ at 70° C. instead of >90° C. with e.g.SG125.

In yet another example, multiple stages of $MgCl_2$ may be used, for instance, $MgCl_2$ is used in different TCM modules. The modules and the water condenser are connected through a central tube as explained herein-above. In this example a sorption method is illustrated that allows to achieve a higher temperature $T_S$, which in turn can be used for higher heat needs such as DHW (60° C.).

The invention claimed is:

1. A heat exchanger system for thermochemical storage and release, the system comprising a thermal exchange circuit with a heat exchanger fluid, the thermal exchange circuit further in thermal connection with a thermochemical module, the thermochemical module comprising a thermochemical material, comprising a hygroscopic salt, that stores and releases heat by a thermochemical exchange process under release or binding of a sorbate by a reversible chemical reaction between said thermochemical material and said sorbate, wherein the thermochemical module is provided with a granular material that compartments the thermochemical material in granular form so that the granular material comprises a polymer wall structure that is transgressive to the sorbate but retains the thermochemical material while the thermochemical material is in a liquid hydrated form, wherein the granular material is arranged to provide, in use, an interspace between the granular material, that provides an exchange of the sorbate via the interspace to the thermochemical material, wherein the granular material has an elongate form wherein the granular material is coaligned relative other granular material in a direction along the elongate form to an interspaced channel structure oriented towards an exhaust of the heat exchanger system, and wherein the polymer wall structure comprises perforations in the range of microns.

2. The heat exchanger system according to claim 1, wherein the polymer wall structure comprises one or more of a polymeric material selected from the group consisting of: polyacrylate, polymethacrylate, polyvinylpyrrolidone, polyurethanes, polyepoxides poly(ethyl)methacrylate, poly(isoprene), polysiloxane (vulcanised), cellulose, cellulose derivative, poly(oxy-2,6-dimethyl-1,4-phenylene), polystyrene, polyacrylonitrile, a copolymer of any of the group, and a mixture of any of the group.

3. The heat exchanger system according to claim 2, wherein the polymeric material is selected from the group consisting of: cellulose, methylcellulose, ethylcellulose, cellulose acetate, and cellulose nitrate.

4. The heat exchanger system according to claim 1, further comprising a planar structure containing a thermoconductive material, which extends in a direction away from circuit walls that form the thermal exchange circuit and that thermomechanically connects the circuit walls to the thermochemical material.

5. The heat exchanger system according to claim 4, wherein the planar structure traverses the interspaced channel structure.

6. The heat exchanger system according to claim 4, wherein the planar structure is formed by strips of metal foil extending from the circuit walls.

7. The heat exchanger system according to claim 1, wherein the polymer wall structure is formed by a multi-component additive manufacturing process.

8. The system according to claim 1, wherein the hygroscopic salt is selected from the group consisting of: chlorides, sulfates, phosphates, bromides, iodides, nitrates, sulfides.

9. The system according to claim 1, wherein the sorbate comprises one or more of the group consisting of: water, $NH_3$, $CH_3OH$, and $C_2H_5OH$.

10. The system according to claim 1, wherein the granular material has a shape formed by polymer tubes filled with the thermochemical material.

11. A heat exchanger system for thermochemical storage and release, the system comprising a thermal exchange circuit with a heat exchanger fluid, the thermal exchange circuit further in thermal connection with a thermochemical module, the thermochemical module comprising a thermochemical material, comprising a hygroscopic salt, that stores and releases heat by a thermochemical exchange process under release or binding of a sorbate by a reversible chemical reaction between said thermochemical material and said sorbate,
wherein the thermochemical module is provided with a granular material that compartments the thermochemical material in granular form so that the granular material comprises a polymer wall structure that is transgressive to the sorbate but retains the thermochemical material while in a liquid hydrated form,
wherein the granular material is arranged to provide, in use, an interspace between the granular material, that provides an exchange of the sorbate via the interspace to the thermochemical material, and
wherein the polymer wall structure comprises perforations on the scale of microns.

12. The system according to claim 11, wherein the granular material has a shape formed by polymer tubes filled with the thermochemical material.

13. The heat exchanger system according to claim 11, wherein the polymer wall structure comprises one or more of a polymeric material selected from the group consisting of: polyacrylate, polymethacrylate, polyvinylpyrrolidone, polyurethanes, polyepoxides poly(ethyl)methacrylate, poly(isoprene), polysiloxane (vulcanised), cellulose, cellulose derivative, poly(oxy-2,6-dimethyl-1,4-phenylene), polystyrene, polyacrylonitrile, a copolymer of any of the group, and a mixture of any of the group.

14. The heat exchanger system according to claim 13, wherein the polymeric material is selected from the group consisting of: cellulose, methylcellulose, ethylcellulose, cellulose acetate, and cellulose nitrate.

15. The heat exchanger system according to claim 11, further comprising a planar structure containing a thermoconductive material, which extends in a direction away from circuit walls that form the thermal exchange circuit and that thermomechanically connects the circuit walls to the thermochemical material.

16. The heat exchanger system according to claim 15, wherein the granular material has a longitudinal form, and wherein the granular material is aligned in a direction along the longitudinal form to an interspaced channel structure oriented towards an exhaust of the heat exchanger system, and
wherein the planar structure traverses the interspaced channel structure.

17. The heat exchanger system according to claim 15, wherein the planar structure is formed by strips of metal foil extending from the circuit walls.

18. The heat exchanger system according to claim 11, wherein the polymer wall structure is formed by a multi-component additive manufacturing process.

19. The system according to claim 11, wherein the hygroscopic salt is selected from the group consisting of: chlorides, sulfates, phosphates, bromides, iodides, nitrates, sulfides.

* * * * *